(12) United States Patent
Nelson et al.

(10) Patent No.: US 9,221,142 B2
(45) Date of Patent: Dec. 29, 2015

(54) GUARD ASSEMBLY

(71) Applicant: Orbital ATK, Inc., Dulles, VA (US)

(72) Inventors: Jacob L. Nelson, Layton, UT (US);
Steven M. Garner, Ogden, UT (US)

(73) Assignee: Orbital ATK, Inc., Dulles, VA (US)

( * ) Notice: Subject to any disclaimer, the term of this patent is extended or adjusted under 35 U.S.C. 154(b) by 273 days.

(21) Appl. No.: 13/803,361

(22) Filed: Mar. 14, 2013

(65) Prior Publication Data
US 2014/0271001 A1 Sep. 18, 2014

(51) Int. Cl.
*B23Q 11/00* (2006.01)
(52) U.S. Cl.
CPC ....... *B23Q 11/0046* (2013.01); *B23B 2260/058* (2013.01); *B23B 2270/30* (2013.01); *B23B 2270/62* (2013.01); *B23Q 11/0071* (2013.01); *Y10T 408/44* (2015.01); *Y10T 408/50* (2015.01); *Y10T 409/304088* (2015.01)
(58) Field of Classification Search
CPC ............ B23B 2270/30; B23B 2270/62; B23B 2260/058; B23B 47/34; B23Q 11/0046; B23Q 11/0071
USPC ............................ 408/67, 110, 111, 112, 202
See application file for complete search history.

(56) References Cited

U.S. PATENT DOCUMENTS

| | | | | |
|---|---|---|---|---|
| 2,409,377 | A * | 10/1946 | Miller | ........................... 408/112 |
| 3,022,806 | A | 2/1962 | Johnston | |
| 3,837,383 | A * | 9/1974 | Ko | ............................. 144/251.2 |
| 5,125,190 | A * | 6/1992 | Buser et al. | .................... 451/456 |
| 6,200,075 | B1 * | 3/2001 | Gaskin et al. | ................... 408/67 |
| 7,625,265 | B2 * | 12/2009 | Woods et al. | .................. 451/451 |
| 8,282,447 | B1 | 10/2012 | Buser | |
| 2007/0178815 | A1 * | 8/2007 | Buser | ............................ 451/451 |
| 2007/0264092 | A1 * | 11/2007 | Kesten | ............................ 408/67 |
| 2008/0124181 | A1 | 5/2008 | Hintze et al. | |
| 2010/0285729 | A1 * | 11/2010 | Loveless et al. | ............... 451/456 |
| 2011/0177763 | A1 * | 7/2011 | Clayton | ........................ 451/344 |
| 2012/0051864 | A1 | 3/2012 | Khurana | |

FOREIGN PATENT DOCUMENTS

EP 1 410 880 A1 4/2004
EP 1 894 653 A1 3/2008

OTHER PUBLICATIONS

International Search Report, ISA/EP, International Application No. PCT/US2014/019392, Jul. 3, 2014, four (4) pages.
Written Opinion of the International Searching Authority, ISA/EP, International Application No. PCT/US2014/019392, Jul. 3, 2014, five (5) pages.

* cited by examiner

*Primary Examiner* — Daniel Howell
*Assistant Examiner* — Yasir Diab
(74) *Attorney, Agent, or Firm* — TraskBritt

(57) ABSTRACT

A guard assembly for a tool is provided. The guard assembly has a body with a first open end, a second open end and a mid-portion between the first open end and the second open end. The body forms an inner passage between the first open end and the second open end. The passage is configured to receive a portion of a tool. The body has a plurality of spaced slots. Each slot extends from the first open end a select distance toward the mid-portion of the body. The body has a port and a plurality of openings proximate the second open end to allow air or fluid passage.

18 Claims, 3 Drawing Sheets

GUARD ASSEMBLY

STATEMENT REGARDING FEDERALLY SPONSORED RESEARCH OR DEVELOPMENT

This invention was made pursuant to United States Government Contract No. N00019-10-00002. The Government may have certain rights in this invention.

BACKGROUND

When drilling holes, especially when creating a countersink hole into surfaces of manufacturing goods, the precise control of the hole depth or countersink depth is often desirable. This is particularly true in the manufacturing of aircraft components where it is often necessary that the head of a fastener inserted into a hole drilled into an aircraft surface component be flush with the surface of the component.

To countersink a surface, countersinking tools that include drill bits such as microstops may be used. The countersinking process typically requires frequent inspection and adjustment to achieve the desired, precise countersunk hole. If a part or component of the countersinking tool (e.g., a cutter) has to be changed during the countersinking operation, further adjustments may be required. While most countersink tools have large cutouts to allow operator access to the cutter to change blades, this may present a risk of the operator's fingers contacting the blade. In addition, when in operation, the countersinking tool generates dust, chips, and splinters, which may be ejected or blown about.

SUMMARY

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a guard assembly is provided. The guard assembly includes a housing having a first open end, a second open end and a mid-portion between the first open end and the second open end. The housing forms an inner passage between the first open end and the second open end, the passage is configured to receive a portion of a tool. The housing has a plurality of spaced slots. Each slot extends from the first open end a select distance toward the mid-portion of the housing. Included in the housing are a port and a plurality of openings proximate the second open end to allow air or fluid passage.

In another embodiment, another guard assembly is provided. The guard assembly includes a cylindrical body having an open first end and an opposed, open second end. The body forms an inner passage between the open first end and the open second end. The first open end of the body is configured to receive a portion of a tool. The body further includes at least one opening proximate the second end to allow air flow. The body further has a suction passage proximate the second end and a suction port that is in fluid communication with the suction passage. The suction port is configured and arranged to be coupled to a vacuum system.

In still another embodiment, a microstop guard assembly is provided. The microstop guard assembly includes a cylindrical body having a first open end and an opposed, second open end. The body forms an inner passage between the first open end and the second open end. The inner passage of the body includes an inner ridge extending inward from the inner passage proximate the first open end of the body. The inner ridge is configured and arranged to snap-fit the guard assembly to a portion of a microstop-containing tool. The body further includes a plurality of spaced, parallel slots. Each slot extends from the first open end a select distance in the mid-portion of the body. The body also includes at least one opening proximate the second end to allow air flow and visibility to the microstop. The body further includes a suction passage proximate the second end and opposite the at least one opening. A suction port is in fluid communication with the suction passage. The suction port is configured and arranged to be coupled to a vacuum system.

BRIEF DESCRIPTION OF THE DRAWINGS

The present invention can be more easily understood and further advantages and uses thereof will be more readily apparent, when considered in view of the detailed description and the following figures in which.

In accordance with common practice, the various described features are not drawn to scale but are drawn to emphasize specific features relevant to the present invention. Reference characters denote like elements throughout the figures and the specification.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
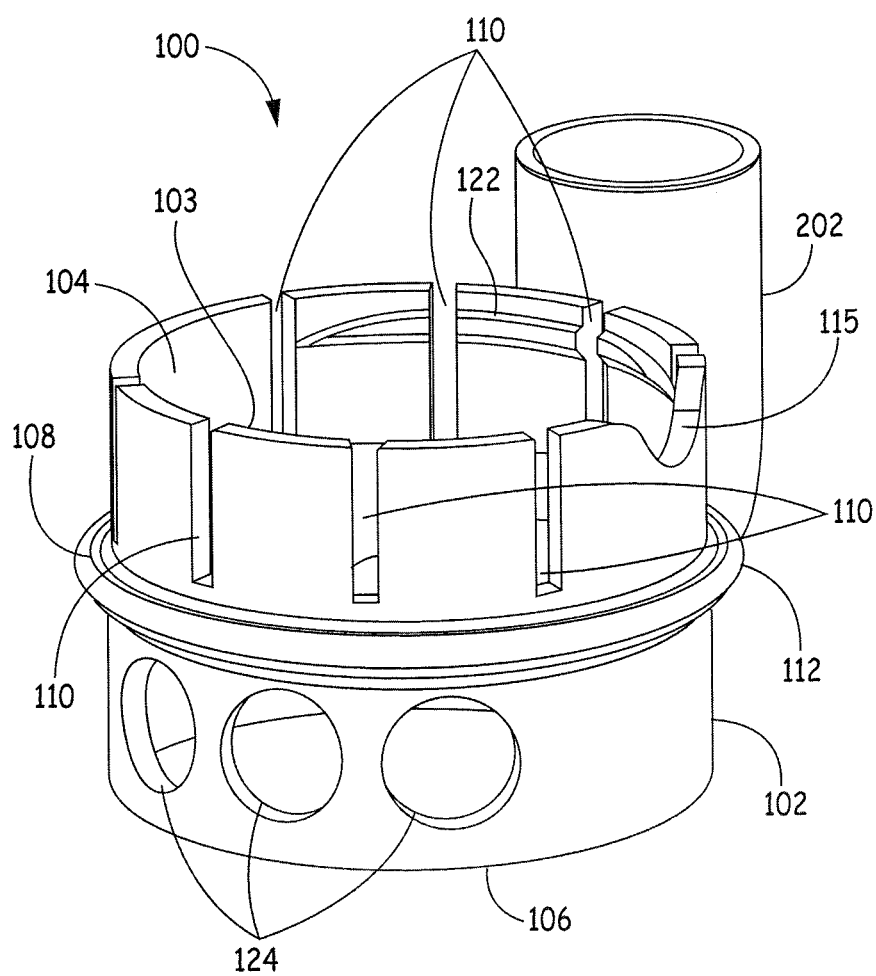
FIG. 1 is a first side perspective view of a guard assembly of an embodiment of the present invention.
Figure 2:
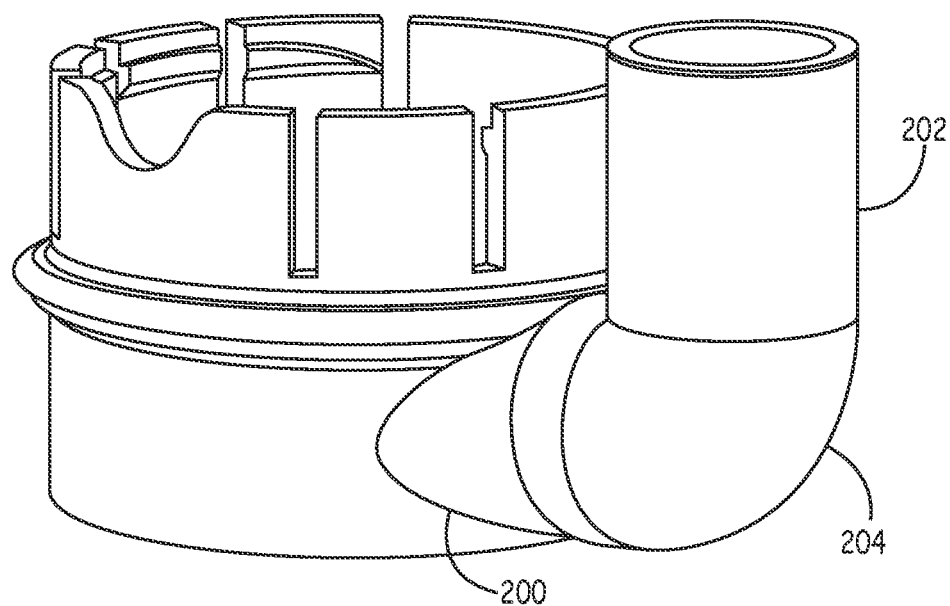
FIG. 2 is a second side perspective view of the guard assembly in FIG. 1.

Embodiments of the present invention provide a guard assembly that may be easily assembled and disassembled over a standard tool (e.g., a countersink) that provides for operator safety and efficient clean up. In one embodiment, a guard assembly 100 is provided that may be attached to a tool (e.g., conventional microstop countersink tools, or otherwise drilling tools) without altering the functioning and efficiency of the tools. The guard assembly 100 is configured or adapted to be attached to the tool for easy assembly and disassembly. The guard assembly 100 includes a hollow housing or body 102, which as shown, for example, in FIGS. 1 and 2, is cylindrical. Body 102 includes a first open end 104 and a second open end 106 and a mid-portion 108. The body 102 forms an inner passage 103 between the first open end 104 and the second open end 106. On an outer circumference of guard assembly 100 is a ring member 112. The ring member 112 may be positioned at the mid-portion 108 of the body 102. Ring member 112 aids in griping for easy assembly and disassembly of guard assembly 100. Ring member 112 may also provide a grip area for an operator to hold on to while operating a drilling or countersinking tool.

The body 102 has a plurality of spaced, parallel slots 110. Each slot 110 extends from the first open end 104 of body 102 a select distance. In one embodiment, slots 110 extend from the first open end 104 toward (e.g., to) the mid-portion 108. Slots 110 provide for the guard assembly 100 to be pliable for easy attachment or detachment of guard assembly 100 from a tool.

Figure 3:
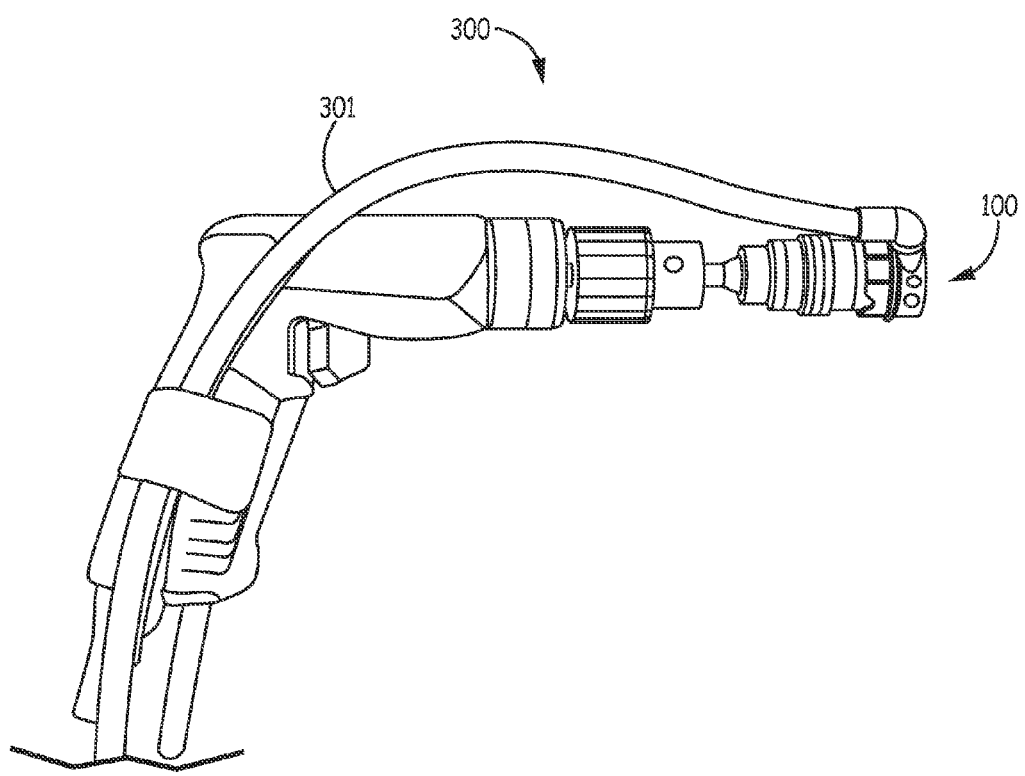
FIG. 3 is a side perspective view of the guard assembly of FIG. 1 attached on a tool.

Desirably, an interior portion of the body 102 proximate the first open end 104 may include one or more grooves or lips 122 that aid in snap-fitting or otherwise engaging complementary recesses or tangs so as to attach or connect guard assembly 100 to a tool (e.g., a countersinking tool 300 as shown in FIG. 3). As shown in FIG. 1, the grooves or lips 122 are positioned toward the proximal side of the body 102. The body 102 further has a rounded grove 115 that extends in from the first open end 104. Grove 115 provides an operator visible access to the depth indicator mark or other indicators on a tool (e.g., microstop) when the guard assembly is in place.

Body 102 includes cutouts or openings 124. The cutouts or openings 124 provide for fluid passage (e.g., air) and visibility to a cutter (not shown). As shown in FIG. 1, the cutouts or openings 124 may be circular or oval but any number, shape and size are contemplated such that the cutouts or openings 124 permit fluid or air flow, visibility to the cutter, and prevent an operator's fingers contacting a blade or cutter of a microstop countersink tool. The cutouts or openings 124 may range in diameters from 0.1 inch to 0.4 inch.

Adjacent to body 102 toward the second open end 106 is an outlet or port 200 that allows a tool to be connected to a suction source. The port 200 may connect to a tubular member 202. The tubular member 202, as shown in FIG. 2, may be connected to port 200 via an elbow joint 204. Tubular member 202 may, for example, act as a conduit for dust or chips to be sucked out during the operation of the tool. The open end of tubular member 202 may be connected to one end of a vacuum via a vacuum hose 301 (see FIG. 3) or fluid source, e.g., water. In one embodiment, as shown in FIG. 1, cutouts or openings 124 may be opposite from port 200. This aids in air passing through and being sucked or exited out port 200.

While guard assembly 100 is described as a single piece, the guard assembly 100 may be made of two sections with each section configured to be attached to a tool (e.g., microstop countersinking). The two sections may be separately and directly secured to the tool by any suitable means, for example, screws, brackets, clamps or the like. The two sections would be configured to serve the roles as that described above.

Guard assembly 100 is made from a variety of materials including polyethylene, polypropylene, polycarbonate, nylon, acetal resins, acrylonitrile butadiene styrene or polyvinyl chloride and other suitable thermoplastic or thermoset materials. The chosen materials desirably are lightweight, cheap to manufacture and impact resistant. Known techniques may be used in manufacturing, such as injection molding or three-dimensional (3D) printing.

The guard assembly 100 may be included in a kit. The kit may include one or more guard assemblies 100 of the same or different sizes with one or more countersinking tools or microstops and an enclosure for housing various components of the kit. The kit can include any conventional enclosure.

Although specific embodiments have been illustrated and described herein, it will be appreciated by those of ordinary skill in the art that any arrangement, which is calculated to achieve the same purpose, may be substituted for the specific embodiments shown. This application is intended to cover any adaptations or variations of the present invention. Therefore, it is manifestly intended that this invention be limited only by the claims and the equivalents thereof.

The invention claimed is:

1. A guard assembly, comprising:
a housing having a first open end, a second open end and a mid-portion between the first open end and the second open end;
the housing forming an inner passage between the first open end and the second open end, the inner passage configured to receive a portion of a tool; and
the housing having a plurality of spaced slots, each slot extending from the first open end a select distance toward the mid-portion of the housing, the plurality of slots defining a plurality of pliable fingers therebetween, wherein each of the plurality of pliable fingers is configured to independently engage an outer surface of a housing of a tool to retain the guard assembly on the tool;
the housing having a port and a plurality of openings proximate the second open end to allow air or fluid passage; and
the housing having a radially protruding portion of the housing defining a ring integral with the housing, the ring extending around the outer circumference of the housing of the guard assembly, the ring being positioned between the plurality of spaced slots extending from the first open end the select distance toward the mid-portion of the housing and the plurality of openings proximate the second open end.

2. The guard assembly of claim 1, further adapted to be connected to a microstop countersinking tool.

3. The guard assembly of claim 1, wherein the port is configured and arranged to be connected to a suction source.

4. The guard assembly of claim 1, wherein the plurality of openings is sized to prevent fingers from being able to pass through.

5. The guard assembly of claim 1, wherein each of the plurality of slots is substantially parallel to each other, and wherein only the plurality of pliable fingers are configured to retain the guard assembly on the outer surface of the housing of the tool.

6. The guard assembly of claim 1, wherein the guard assembly comprises at least one feature on a portion of the housing defining the inner passage, the at least one feature configured to removably engage with a complementary feature on the outer surface of the tool to snap-fit the housing on the tool.

7. The guard assembly of claim 1, wherein the guard assembly is made of one of polyethylene, polypropylene and polycarbonates.

8. A guard, comprising:
a single, monolithic cylindrical body having an open first end and an opposed, open second end, the body forming an inner passage between the open first end and the open second end, the open first end of the body configured to receive a portion of a tool, the body further including at least one opening extending through an outer circumferential wall of the cylindrical body in a radial direction of the cylindrical body proximate the open second end to allow air flow, the body further having a suction passage through the body proximate the open second end, and a ring portion integral with the body and extending around the outer circumferential wall of the body at generally a mid-point of the body between the first open end and the second open end and between the suction passage through the body and the open first end of the body; and the body defining a suction port in fluid communication with the suction passage, the suction port configured and arranged to be coupled to a vacuum system.

9. The guard of claim 8, wherein the suction passage radially opposes the at least one opening about a circumference of the cylindrical body of the guard.

10. The guard of claim 8, further comprising:
the body having a plurality of slots, each slot extending in the body from the open first end a select distance.

11. The guard of claim 8, further comprising:
at least one inner ridge extending inward from the inner passage proximate the first open end of the body, the inner ridge configured and arranged to snap-fit the guard to the portion of the tool.

12. The guard of claim 8, wherein the suction port is elbow-shaped.

13. The guard of claim 8, further comprising:
the body further having a rounded groove extending in a select distance from the first open end to allow visualization of a depth indicator mark on the tool when the guard is coupled thereto.

14. A microstop guard, comprising:
a monolithic cylindrical body having a first open end and an opposed, second open end, the body forming an inner passage between the first open end and the second open end, the inner passage including an inner ridge extending inward from the inner passage proximate the first open end of the body, the inner ridge configured and arranged to snap-fit the microstop guard to a portion of a microstop-containing tool;
the body further including a plurality of spaced, parallel slots, each slot extending from the first open end a select distance in a mid-portion of the body, the body configured to directly engage around a portion of an outer surface of a housing of the microstop-containing tool at the plurality of spaced slots, the plurality of slots defining a plurality of pliable fingers therebetween, wherein each of the plurality of pliable fingers is configured to flex outwardly in order to receive the portion of the outer surface of the housing of the microstop-containing tool within the cylindrical body and to directly and independently engage with the portion of the outer surface of the housing of the tool to retain the microstop guard on the microstop-containing tool solely with the plurality of pliable fingers;
the body further having at least one opening proximate the second open end to allow air flow and visibility to the microstop guard, the body further having a suction passage proximate the second open end and generally opposite the position of the at least one opening; and
the body defining a suction port in fluid communication with a suction passage, the suction port configured and arranged to be coupled to a vacuum system.

15. The microstop guard of claim 14, wherein the body exhibits a gripping feature extending around at least a portion of an outer circumference of the body and positioned between the plurality of slots proximate the first open end and the at least one opening proximate the second open end.

16. The microstop guard of claim 14, wherein the at least one opening proximate the second open end is circular having a diameter of 0.1 inch to 0.4 inch.

17. The microstop guard of claim 14, wherein the micro stop guard is made of one of polyethylene, polypropylene, polycarbonate, nylon, acetal resins, acrylonitrile butadiene styrene and polyvinyl chloride.

18. The microstop guard of claim 14, wherein the body is made by injection molding.

* * * * *

UNITED STATES PATENT AND TRADEMARK OFFICE
CERTIFICATE OF CORRECTION

PATENT NO. : 9,221,142 B2  Page 1 of 1
APPLICATION NO. : 13/803361
DATED : December 29, 2015
INVENTOR(S) : Jacob L. Nelson et al.

It is certified that error appears in the above-identified patent and that said Letters Patent is hereby corrected as shown below:

In the specification:

| | | |
|---|---|---|
| COLUMN 1, | LINE 7, | change "N00019-10-00002." to --N00019-10-C0002.-- |
| COLUMN 3, | LINE 15, | change "rounded grove 115" to --rounded groove 115-- |
| COLUMN 3, | LINE 16, | change "Grove 115" to --Groove 115-- |

In the claims:

CLAIM 17,   COLUMN 6,   LINES 28-29,   change "the micro stop guard" to --the microstop guard--

Signed and Sealed this
Nineteenth Day of April, 2016

Michelle K. Lee
*Director of the United States Patent and Trademark Office*